United States Patent [19]

Hirajima et al.

[11] Patent Number: 5,548,570

[45] Date of Patent: Aug. 20, 1996

[54] OPTICAL REPRODUCING CIRCUIT HAVING, A BINARIZED SIGNAL PULSE COMPENSATION CIRCUIT

[75] Inventors: Hiroshige Hirajima, Tenri; Takeshi Yamaguchi, Sakai; Hiroshi Fuji, Souraku-gun, all of Japan

[73] Assignee: Sharp Kabushiki Kaisha, Osaka, Japan

[21] Appl. No.: 547,313

[22] Filed: Oct. 24, 1995

[30] Foreign Application Priority Data

Nov. 30, 1994 [JP] Japan ................... 6-297060

[51] Int. Cl.$^6$ ........................................ G11B 7/00
[52] U.S. Cl. ................... 369/59; 369/124; 369/47
[58] Field of Search ................ 369/48, 59, 58, 369/54, 47, 124, 32; 360/25, 27, 37.1

[56] References Cited

U.S. PATENT DOCUMENTS 5,416,641   5/1995   Minakawa ................... 360/27

FOREIGN PATENT DOCUMENTS 61-242442   of 1986   Japan .

Primary Examiner—Nabil Z. Hindi
Attorney, Agent, or Firm—Nixon & Vanderhye

[57] ABSTRACT

An information reproducing circuit for reproducing digital information from a signal read by scanning an optical disk comprises an HPF 1 inputting the read signal and removing a low-frequency component from the input signal for outputting the same, an adder 2 inputting the signal outputted from the HPF 1 and adding a feedback signal having an amplitude matching with half that of the input signal to the input signal for outputting the same, a comparator 3 inputting the signal outputted from the adder 2 and converting the input signal to a binarized signal through a threshold value signal for outputting the binarized signal, a compensation circuit 5 inputting the binarized signal outputted from the comparator 3 and outputting the input signal while compensating the same through a compensation signal for compensating the low-frequency component of the read signal, and an LPF 6 inputting the signal outputted from the circuit 5 and removing a high-frequency component from the input signal for supplying the same to the adder 2 as the feedback signal.

26 Claims, 11 Drawing Sheets

Fig. 8
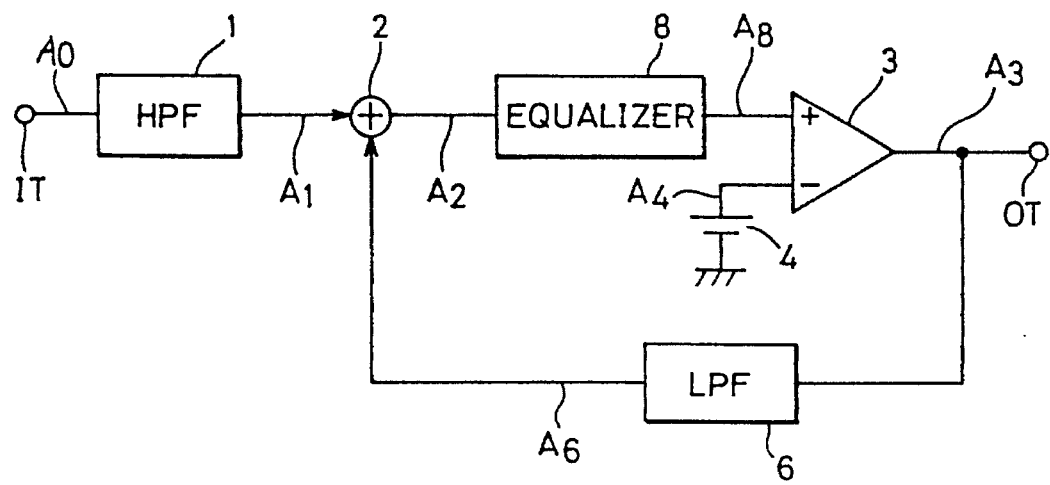
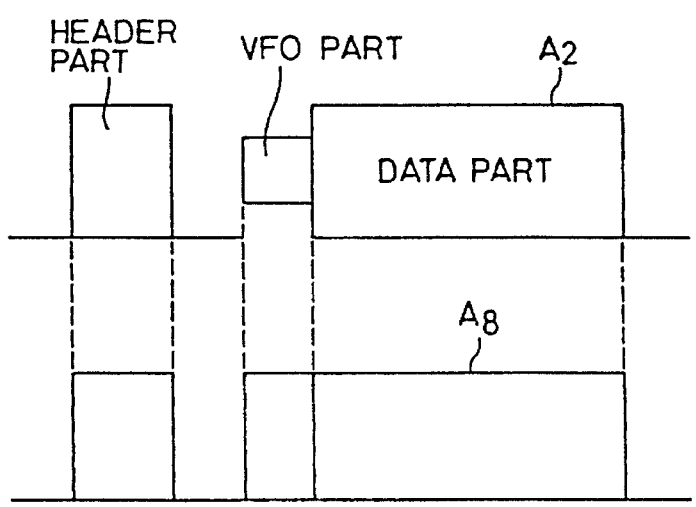
Fig. 9(A)
Fig. 9(B)

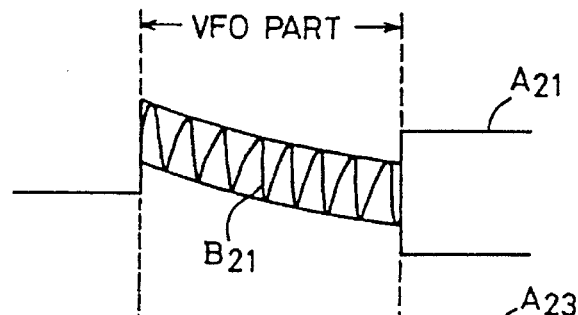
Fig. 14(A)
Prior Art
Fig. 14(B)
Prior Art
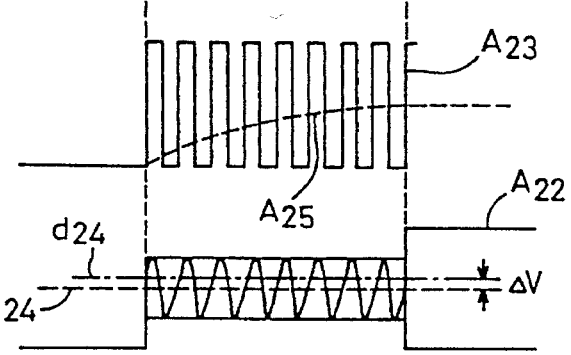
Fig. 14(C)
Prior Art
Fig. 14(D)
Prior Art
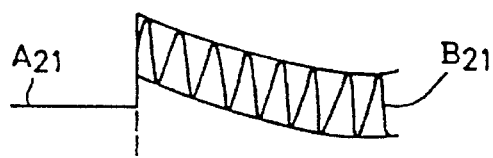
Fig. 15(A)
Prior Art
Fig. 15(B)
Prior Art
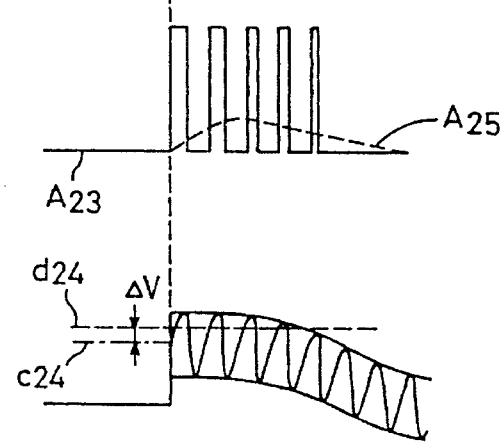
Fig. 15(C)
Prior Art

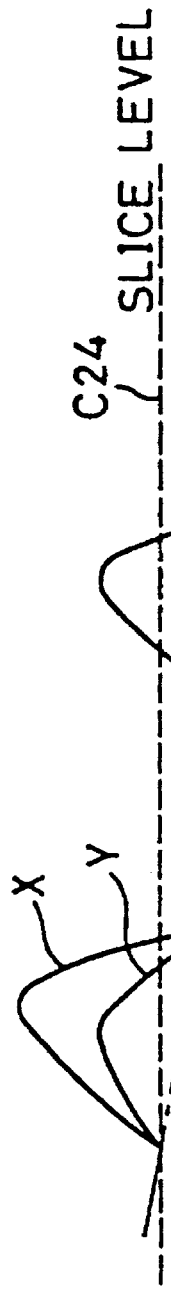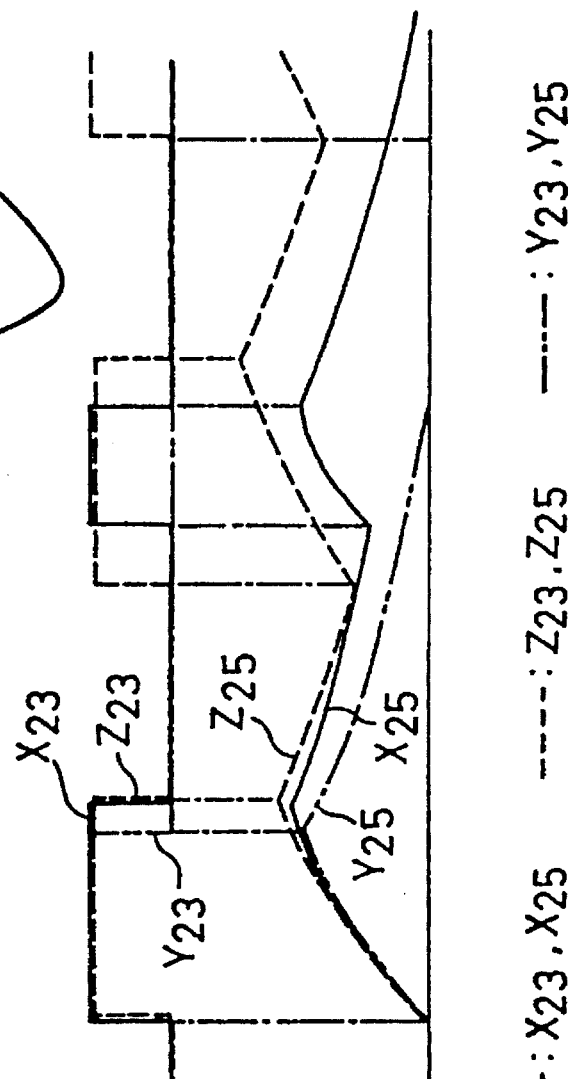
Fig. 16(A) Prior Art
Fig. 16(B) Prior Art
Fig. 16(C) Prior Art

OPTICAL REPRODUCING CIRCUIT HAVING, A BINARIZED SIGNAL PULSE COMPENSATION CIRCUIT

BACKGROUND OF THE INVENTION

1. Field of the Invention

The present invention relates to an information reproducing circuit which is provided on an apparatus for optically recording or reproducing digital information in or from a recording medium, and more particularly, it relates to an information reproducing circuit which receives and binarizes a signal optically read from a recording medium and outputs the same as a digital signal.

2. Description of the Background Art

In general, a recording medium such as an optical disk or a magnet-optical disk forms a sector format which consists of a header part and a data part on its track through a gap, for recording/reproducing information in units of sectors.

FIG. 10 is a model diagram showing an exemplary sector format on a recording medium which is applied to the prior art and embodiments of the present invention. Referring to FIG. 10, the sector format includes a sector mark (SM) 30 indicating the head of the sector, VFO parts 31 which are signal regions employed by a VFO (variable frequency oscillator), producing synchronous clocks for demodulating data in an information reproducing system, for producing clocks synchronous with data in reproduction and arranged in a header part and at the head of a data part respectively, address marks (AM) 32, addresses (ID) 33, a postamble (PA) 34, synchronizing signals (Sync) 35, a buffer (Buffer) 36 and data 37. The VFO part 31 of the data part is provided for synchronous clock generation in reproduction as to the data 37 immediately following the same, while the VFO part 31 of the head part is provided for synchronous clock generation in reproduction as to the AM 32 and ID 33 immediately following the same.

An apparatus for recording/reproducing digital information in/from a recording medium such as an optical disk or a magnet-optical disk comprises an optical head for irradiating the recording medium with a laser beam for reproducing the information, a photodetector for photoelectrically converting change in quantity of light reflected by the recording medium upon irradiation with the laser beam into an electric signal, and an information reproducing circuit for binarizing the electric signal and reproducing the same into the original digital signal.

The photodetector detects reflected light of a constant quantity and feeble change in quantity of the reflected light resulting from digital information which has been recorded on the recording medium, and hence a DC component corresponding to the reflected light of the constant quantity is superposed on/appears in a signal of feeble digital information corresponding to the feeble change in quantity of the reflected light when the result of the photodetection is converted to an electric signal. The signal of the digital information (hereinafter referred to as a reproduced signal) is a feeble signal which is buried in a noise, and hence the obtained electric signal must be amplified for subsequent processing. In consideration of the dynamic range of an amplifier which is employed for the amplification at this time, it is effective to previously remove the DC component which is superposed on the reproduced signal. In the conventional apparatus, therefore, the DC component is removed from the reproduced signal by AC coupling in advance of the signal amplification. When the DC component is removed by AC coupling, however, part of a low-frequency component of the reproduced signal is also lost disadvantageously.

A circuit employing decision feedback is known as a reproducing circuit for compensating the low-frequency component as lost (refer to Japanese Patent Laying-Open No. 61-242442 (1986)). FIG. 11 is a block diagram showing the information reproducing circuit which is disclosed in Japanese Patent Laying-Open No. 61-242442. Referring to FIG. 11, the information reproducing circuit includes an input terminal 20, a high-pass filter (hereinafter referred to as an HPF) 21, an adder 22, a comparator 23, a constant voltage generator 24, a low-pass filter (hereinafter referred to as an LPF) 25 and an output terminal 26.

FIG. 12 is a spectral diagram illustrating the circuit operation of FIG. 11. With reference to FIGS. 11 and 12, the operation of the information reproducing circuit shown in FIG. 11 employing decision feedback is now described.

FIG. 12 shows the spectrum of an input signal A20 which is inputted in the input terminal 20 shown in FIG. 12 at (a). The input signal A20 is a reproduced signal from which a DC component superposed thereon has been removed by AC coupling, and part of its low-frequency component is lost. Upon passage through the HPF 21, this input signal A20 is converted to a signal A21 having a spectrum shown at (b) in FIG. 12.

In order to convert the spectrum of an output signal A22 from the adder 22 to that having a compensated low-frequency component as shown at (d) in FIG. 12, the spectrum of a signal A25 which is fed back must be that shown at (c) in FIG. 12. The comparator 23 and the LPF 25 shown in FIG. 11 generate the feedback signal A25 having the spectrum shown at (c) in FIG. 12.

The comparator 23 compares the output signal A22 from the adder 22 with a slice level signal A24 of a prescribed potential which is outputted from the constant voltage generator 24, to output a binarized signal A23 to the LPF 25. The LPF 25 removes a high-frequency component from the inputted binarized signal A23, to generate the feedback signal (feedback potential) A25. The potential of the slice level signal A24, which indicates a threshold value (called a slice level) for binarizing the signal A22 in order to obtain the original digital information from the signal A22, is decided by the amplitude of the reproduced signal depending on the standard of the medium recording the information. In general, the potential of the slice level signal A24 is set at half the data signal amplitude of the input signal A20. This is because digital information, which is recorded in general high-density recording carrying out mark edge recording, is present at the center of a reproduced data signal amplitude upon reproduction.

Consequently, the output signal A22 of the adder 22 shown in FIG. 11 has the spectrum in which the low-frequency component is compensated as shown at (d) in FIG. 12.

FIG. 13 is a waveform diagram showing the circuit operation of FIG. 11. The waveforms of the output signals A21 and A25 from the HPF 21 and the LPF 25 are shown at (a) and (b) in FIG. 13 in correspondence to the spectra shown at (b) and (c) in FIG. 12 respectively. The transient response at (a) in FIG. 13 results from an influence exerted by the cut-off frequency of the HPF 21. The waveform of the signal A22 shown at (c) in FIG. 13 in correspondence to the spectrum shown at (d) in FIG. 12 is formed by adding up the waveforms of the output signal A21 from the HPF 21 and the feedback signal A25 outputted from the LPF 25 shown at (a) and (b) in FIG. 13 with each other.

In the aforementioned circuit, however, the binarized signal A23 outputted from the comparator 23 may be instabilized or an error may be caused therein since (1) the slice level with respect to the signal is relatively changed or (2) the amplitude of the input signal A20 is small. This results in a remarkable problem in the case of generating clocks synchronous with data which are necessary for reproducing information from the binarized signal A23 by a PLL (phase locked loop) circuit (not shown) provided in a subsequent stage of this circuit, for example. Particularly when an error is caused in either VFO part 31, the PLL circuit cannot generate the synchronous clocks and hence data following the VFO part 31 in the sector cannot be reproduced or an error is caused in the reproduction. Also in the case of obtaining a digital signal from the output signal A22 of the adder 22 by PRML (partial response maximum likelihood) of reproducing the signal by the clocks generated by the PLL circuit, no accurate signal can be derived. Thus, it is extremely desirable to prevent the binarized signal of the VFO part 31 for creating the synchronous clocks from being stabilized or an error is caused in the signal A23.

With reference to FIGS. 14 to 16, description is now made on the case where the binarized signal A23 is instabilized and the case where an error is caused in the binarized signal A23 due to (1) relative change of the slice level with respect to the signal and (2) a small amplitude of the input signal A20.

(1) Relative Change of Slice Level With Respect to Signal

FIG. 14 is an enlarged view showing parts of the waveforms appearing in FIG. 13. FIG. 15 is adapted to illustrate the circuit operation of FIG. 11 upon relative change of the slice level with respect to the signal.

FIG. 14 shows the VFO part 31 of the output signal A21 from the HPF 21 in an enlarged manner, along with the waveform of a high-frequency signal B21 in the VFO part 31 at (a). FIG. 14 also shows an ideal feedback signal A25 at (b). This feedback signal. A25 cancels the transient response of the output signal A21 caused by the HPF 21. The feedback signal A25 shown at (b) in FIG. 14 is formed by inputting the binarized signal A23 outputted from the comparator 23, which is shown at (c) in FIG. 14, in the LPF 25. In reproduction of the VFO part 31, an ideal output signal A22 from the adder 22 shown at (d) in FIG. 14 can be obtained when the binarized signal A23 is a pulse train having a duty ratio of 50%.

When the relative slice level in the reproduced signal fluctuates by a low-frequency noise in the reproduced signal or amplitude fluctuation resulting from fluctuation in light reflectance of the recording medium or the like, however, the binarized signal A23 corresponding to the VFO part 31 outputted from the comparator 23 shown in FIG. 11 is not a pulse signal having a duty ratio of 50%. At this time, the waveform of the feedback signal A25 which is outputted from the LPF 25 following the comparator 23 differs from the ideal waveform shown at (b) in FIG. 14. Considering that the decision feedback is positive feedback, this difference is propagated as an error. This is explained in more concrete terms with reference to waveforms shown in FIGS. 14 and 15.

FIG. 15 shows the waveform of the output signal A21 from the HPF 21 at (a). When ideal decision feedback is made on this signal A21, the output signal A22 of the adder 22 has the waveform shown at (d) in FIG. 14. When a relative slice level (c24) is converted to a slice level (d24) having a potential which is higher by ΔV due a low-frequency noise of the reproduced signal or amplitude fluctuation, however, the pulse duration of the binarized signal A23 outputted from the comparator 23 is smaller than that of a signal having a duty ratio of 50%. Consequently, the level of the feedback signal A25, shown at (b) in FIG. 15, which is processed by the LPF 25 is reduced as compared with that of the ideal feedback signal shown at (b) in FIG. 14. Thus, the level of the output signal A22 from the adder 22 is also reduced as a matter of course, and hence the pulse duration of the binarized signal A23 which is obtained by slicing the signal A22 by the comparator 23 through the relative slice level d24 is further reduced. FIG. 15 shows the waveform of a signal cotained by adding the feedback signal A25 to the signal A21 at (c). The waveform shown at (c) in FIG. 15 extremely differs from the ideal waveform shown at (d) in FIG. 14. This is an instable output signal having an uncanceled transient response. Thus, instability of the signal caused by relative fluctuation of the slice level results in an important problem in synchronous clock generation or data reproduction.

(2) Small Amplitude of Input Signal A20

The decision feedback shown in FIG. 11 is positive feedback, and hence an error which is once caused in the circuit shown in FIG. 11 is propagated. Particularly when the reproduced signal has a small amplitude due to fluctuation in light reflectance, propagation of the error is remarkable. This phenomenon is now described with reference to FIG. 16, which is adapted to illustrate the circuit operation of FIG. 11 in relation to a small amplitude of the input signal.

FIG. 16 shows waveforms of two signals X and Y having the same frequency and offset values and different amplitudes at (a). It is assumed that the signals X and Y shown at (a) in FIG. 16 are enlarged waveforms of the output signal A22 from the adder 22 in signal reproduction of the VFO part 31 which is positioned at the head of the data part, and dc levels thereof are inclined due to an influence exerted by an error caused in the circuit for the decision feedback. FIG. 16 shows waveforms of signals X23 and Y23 which are obtained by binarizing the signals X and Y in the comparator 23 respectively at (b), along with an ideal binarized signal Z23 having a duty ratio of 50% as a signal which is compared with the binarized signals X23 and Y23. It is understood that the binarized signal Y23 corresponding to the signal Y of a smaller amplitude has larger waveform displacement from the ideal binarized signal Z23 as compared with the binarized signal X23 corresponding to the signal X of a larger amplitude. This also applies to respective waveforms of feedback signals X25, Y25 and Z25 corresponding to the binarized signals X23, Y23 and Z23 outputted from the LPF 25, as shown at (c) in FIG. 16.

It is also understood from FIG. 16 that propagation of an error is further remarkable when a binarized signal is obtained in the comparator 23 if the amplitude of the reproduced signal is small. Particularly in reproduction of the VFO part 31 having a small signal amplitude, therefore, the binarized signal A23 which is outputted from the comparator 23 is displaced from the ideal binarized signal and the output signal instabilized.

SUMMARY OF THE INVENTION

An object of the present invention is to provide an information reproducing circuit which can make stable decision feedback in reproduction of a signal for generating synchronous clocks employed for information reproduction.

In order to attain the aforementioned object, provided according to the present invention is an information reproducing circuit which is adapted to reproduce digital information from a signal read by scanning a medium previously recording the digital information, and this information reproducing circuit comprises a high-pass filter, an adder, a comparator, a compensation circuit, and a low-pass filter.

The high-pass filter inputs the aforementioned read signal and removes a low-frequency component from the input signal for outputting the same to the adder. The adder inputs the signal outputted from the high-pass filter, and adds a supplied feedback signal to the input signal for outputting the same to the comparator. The comparator inputs the signal outputted from the adder and binaries the input signal through a threshold value signal for outputting the binarized signal to the compensation circuit. The compensation circuit inputs the binarized signal outputted from the comparator, and outputs the same to the low-pass filter while compensating the same with a compensation signal. The low-pass filter inputs the signal outputted from the compensation circuit and removes a high-frequency component from the input signal, for supplying the same to the adder as the aforementioned feedback signal.

In particular, the compensation circuit further comprises signal generation portion and control portion.

The signal generation portion generates the compensation signal, and outputs the same to the control portion. The control portion inputs the binarized signal outputted from the comparator and the compensation signal outputted from the signal generation portion, for outputting the binarized signal to the low-pass filter in an ordinary period while outputting the compensation signal to the low-pass filter in place of the binarized signal in a compensation period.

The amplitude of the output signal from the low-pass filter is made to match with half that of the output signal from the high-pass filter.

According to the inventive information reproducing circuit having the aforementioned structure, it is possible to binarize the signal read from the medium while compensating the low-frequency component of the signal and canceling a transient response caused by the high-pass filter through decision feedback by the comparator and the low-pass filter.

Particularly in a compensation period such as a period when a signal for generating synchronous clocks employed for information reproduction is read from the medium, for example, the low-frequency component of the signal which is read from the medium is compensated by the compensation signal. While the signal for generating the synchronous clocks employed for information reproduction is read from the medium, therefore, it is possible to suppress a malfunction caused by deterioration of a duty ratio of the binarized signal caused by change of a relative slice level by the threshold value in the comparator and change of a relative slice level resulting from a small amplitude of the read signal, thereby correctly binarizing the read signal. Thus, the synchronous clocks for data reproduction can be stably created. Also in case of reproducing information by PRML utilizing the output of the adder, a highly accurate digital signal can be obtained.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a block diagram showing an information reproducing circuit employing decision feedback according to a second embodiment of the present invention;

FIG. 9 is a waveform diagram for illustrating the operation of an equalizer shown in FIG. 7;

FIG. 14 is an enlarged view partially showing the waveforms shown in FIG. 12;

FIG. 15 is adapted to illustrate the circuit operation of FIG. 11 upon change of a slice level; and FIG. 16 is adapted to illustrate the circuit operation of FIG. 11 with respect to an input signal having a small amplitude.

DESCRIPTION OF THE PREFERRED EMBODIMENTS

Two embodiments of the present invention are now described in detail with reference to the drawings.

(First Embodiment)

Figure 1:
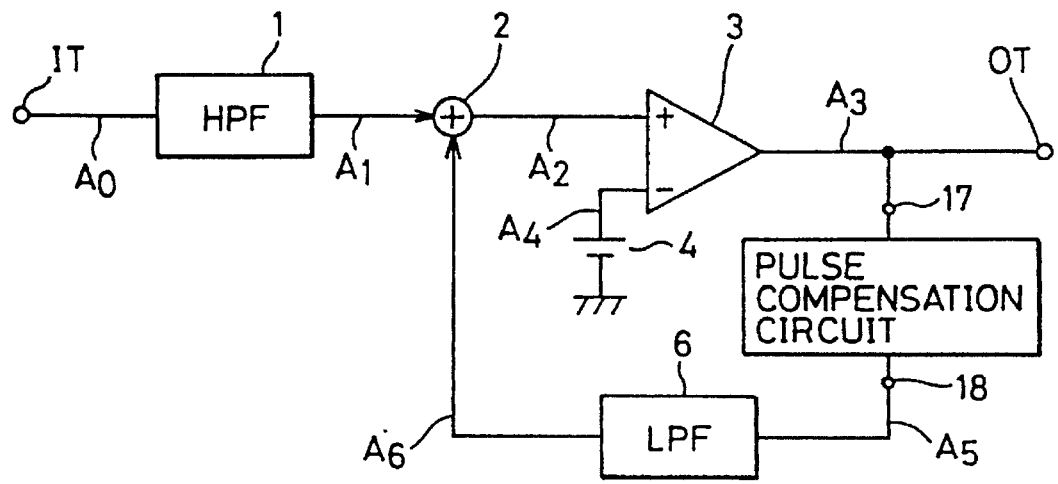
FIG. 1 is a block diagram showing an information reproducing circuit employing decision feedback according to a first embodiment of the present invention.

FIG. 1 is a block diagram showing an information reproducing circuit employing quantization feedback according to a first embodiment of the present invention. The information reproducing circuit shown in FIG. 1 includes an HPF 1, an adder 2, a comparator 3, a constant voltage generator 4, a pulse compensation circuit 5, an LPF 6, an input terminal IT, an output terminal OT and terminals 17 and 18.

Figure 2:
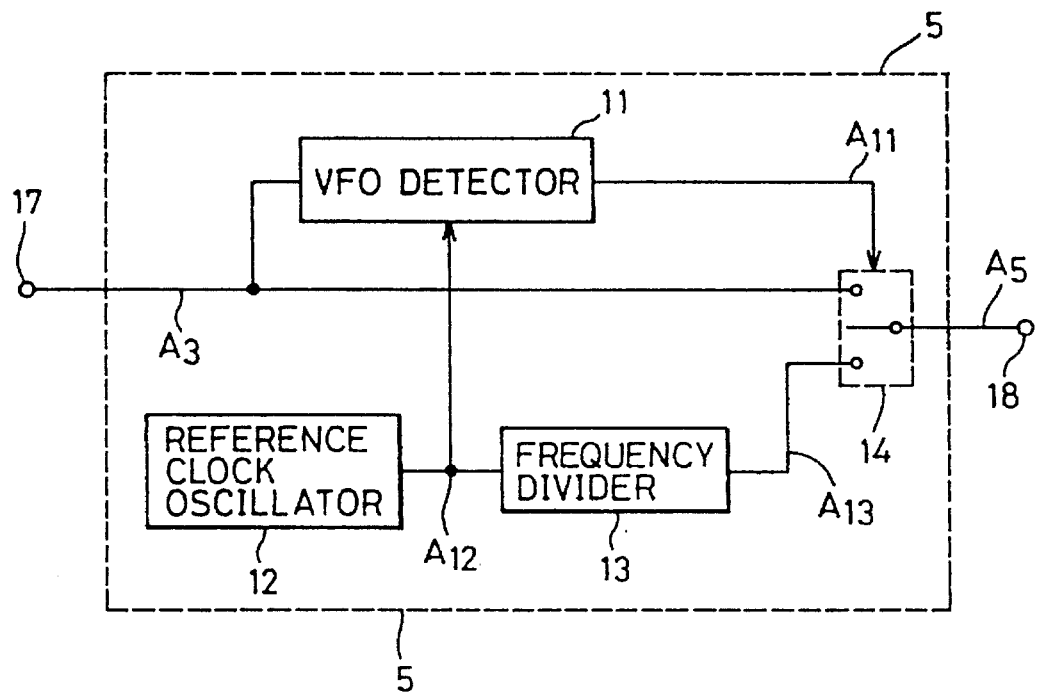
FIG. 2 is a block diagram of a pulse compensation circuit shown in FIG. 1.

FIG. 2 is a block diagram showing the pulse compensation circuit 5 appearing in FIG. 1.

In reproduction of digital information, reflected light from a recording medium is photoelectrically converted, processed by an amplifier, a low-pass filter and an equalizer (not shown) which are provided in a stage precedent to the HPF 1, and thereafter inputted in the terminal IT as an input signal A0. The signal A0 is a reproduced signal from which a DC component is previously removed by AC coupling (not shown) provided in a stage precedent to the amplifier following the photoelectric conversion. The input signal A0 is supplied to the HPF 1 through the terminal IT, so that its low-frequency component is removed by the HPF 1 for removal of an influence exerted by the AC coupling, i.e., the remaining part of the DC component. An output signal A1 from the HPF 1 is inputted in the adder 2, to be added up with a feedback signal A6 in the adder 2 and outputted. An output signal A2 of the adder 2 is inputted in a plus terminal of the comparator 3. A minus terminal of the comparator 3 is supplied with a slice level signal A4 for deciding a voltage indicating a slice level from the constant voltage generator 4. This slice level signal A4 is set at half a data signal amplitude, since digital information which has been recorded in general high-density recording carrying out mark edge recording is positioned upon reproduction at the center of the reproduced data signal amplitude. A binarized signal A3, which is the result of comparison of the signal A2 and the slice level signal A4 by the comparator 3, is inputted in the pulse compensation circuit 5, pulse-compensated therein and transmitted to the LPF 6 as an output signal A5. The signal A5 is imputted in the LPF6, so that the LPF6 average the input signal A5 to output as the signal A6. Thereby, the amplitude of the signal A6 is half that of the signal A5. The LPF 6, which must have a function of canceling the frequency characteristic of the HPF 1 as described above, is prepared from a filter of the same degree having the same cut-off frequency as the HPF 1.

The pulse compensation circuit 5 is now described with reference to FIG. 2. The pulse compensation circuit 5, having input and output sides which are connected to the terminals 17 and 18 shown in FIG. 1 respectively, includes a VFO detector 11 for detecting a VFO part 31 of an inputted signal, an analog switch 14, a frequency divider 13, and a reference clock oscillator 12. The reference clock oscillator 12 may be formed by a reference clock oscillator which is used in an optical disk unit provided with this information reproducing circuit. The analog switch 14 inputs the binarized signal A3 outputted from the comparator 3 and a pulse signal A13 outputted by the frequency divider 13, and selectively outputs either one of these signals as an output signal A5 in response to a VFO part detection signal A11 outputted from the VFO detector 11.

The VFO detector 11 detects a VFO part 31 positioned at the head of a data part with reference to an output signal A12 of the reference clock oscillator 12 and the binarized signal A3 outputted from the comparator 3 after detection of an SM 30, and outputs the VFO part detection signal A11 to the analog 14. The analog switch 14 is controlled by the VFO part detection signal A11. Thereby, the switch 14 outputs the binarized signal A3 which is outputted from the comparator 3 to the LPF 6 through the terminal 18 as an output signal A5 when the input signal A0 is a signal other than the VFO part 31, while outputting the pulse signal A13 which is outputted from the frequency divider 13 as described below to the LPF 6 through the terminal 18 as the output signal A5 when the input signal A0 is a signal of the VFO part 31, i.e., when the signal A11 is outputted. The frequency divider 13 frequency-divides the clocks outputted from the reference clock oscillator 12, and outputs the pulse signal A13 having a duty ratio of about 50% to the switch 14. Thus, the pulse signal having a duty ratio of about 50% is regularly inputted in the LPF 6 while reproduction of the VFO part 31, whereby the feedback signal A6 becomes an ideal signal which is not influenced by fluctuation of the slice level or the level of the amplitude of the input signal A0. Thus, the output signal A2 of the adder 2 which is obtained by adding up the feedback signal A6 and the output signal A1 of the HPF 1 with each other becomes an ideal signal having a compensated low-frequency component.

Figure 3:
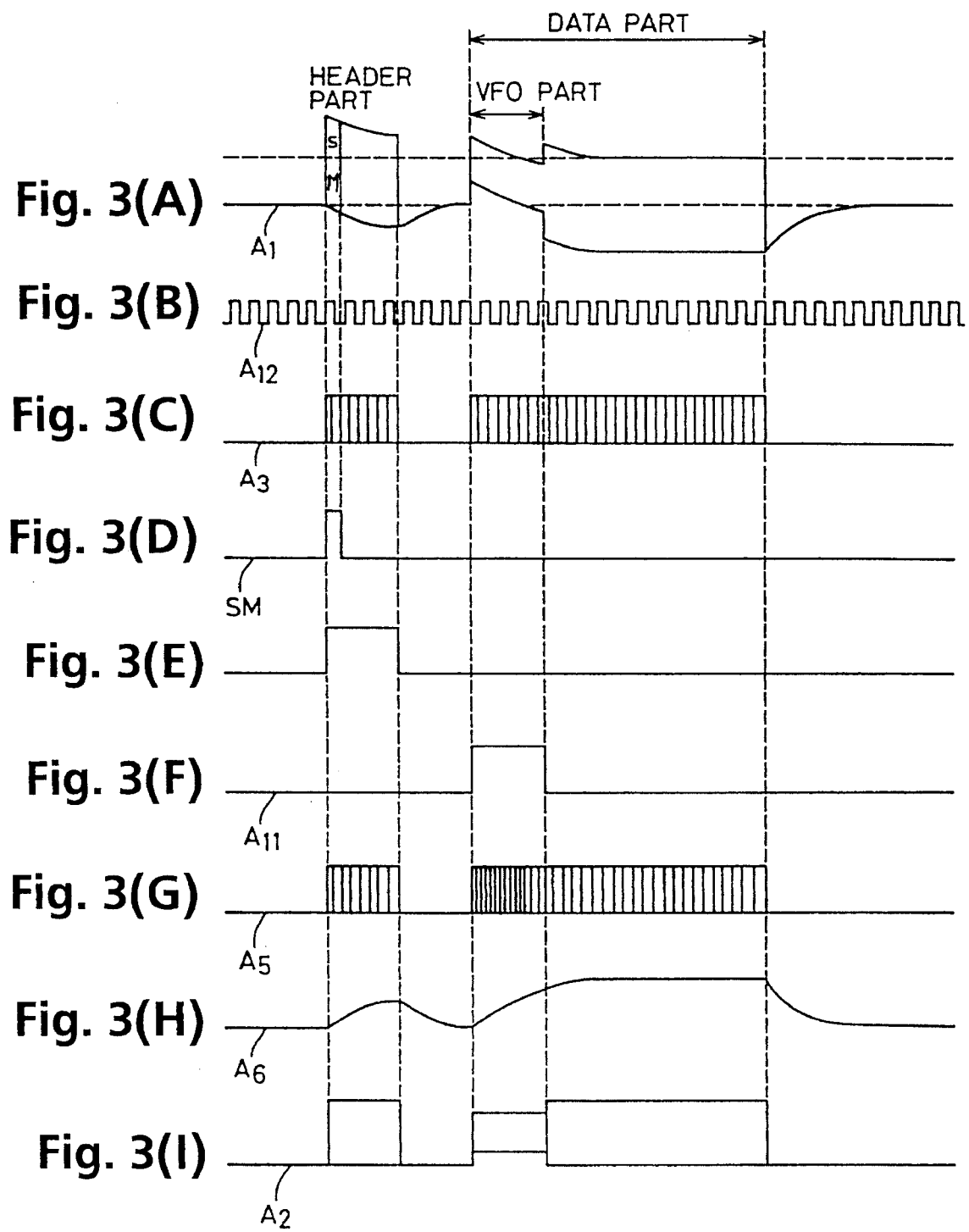
FIG. 3 is a waveform diagram for illustrating the operation of a VFO detector shown in FIG. 2.

This operation is now described with reference to FIG. 3, which is a waveform diagram for illustrating the operation of the VFO detector 11 shown in FIG. 2. FIG. 3 shows the output signal A1 of the HPF 1 at (a), an output signal of the reference,clock oscillator of the optical disk unit, i.e., the output signal A12 of the reference clock oscillator 12 at (b), and the binarized signal A3 outputted from the comparator 3 at (c) respectively. FIG. 3 also shows the result of detection of the SM 30 with respect to these signals by various techniques which have been proposed in general at (d), and the result of detection of the header part on the basis of the result of detection of the SM 30 at (e) respectively. The signal shown at (e) in FIG. 3 can be obtained by counting the clock number of the signal A12 in a period up to a time immediately ahead of starting of the gap between the header part and the data part from the SM 30. FIG. 3 further shows the VFO part detection signal A11 at (f). Referring to (f) in FIG. 3, the signal A11 is started from a time when the binarized signal A3 (see (c) in FIG. 3) outputted from the comparator 3 rises at the first of the data part and completed after a lapse of a time corresponding to the length of the VFO part 31. The length of the VFO part 31 is previously decided, and can be measured by counting the clock number of the output signal A12 from the reference clock oscillator 12. FIG. 3 further shows the waveform of the output signal A5 from the pulse compensation circuit 5 at (g). Referring to (g) in FIG. 3, the output signal A5 is in the waveform of the pulse signal A13 outputted from the frequency divider 13 in reproduction of the VFO part 31. The output signal A5 of the pulse compensation circuit 5 is inputted in the LPF 6, so that the signal A6 exhibits a waveform to compensate for low-frequency component as shown at (h) in FIG. 3 and is added up with the signal A1 shown at (a) in FIG. 3. Thus, the signal A2 obtained as the result of the addition has an ideal waveform shown at (i) in FIG. 3, and is supplied to the comparator 3.

Thus, the information reproducing circuit according to this embodiment can carry out an ideal decision feedback operation, while the amplitude of the input signal A0 must match with that of the input signal A5 in the LPF 6. The reason for this is now described.

If the gain of the high-frequency component of the signal A1 outputted from the HPF 1 mismatches with that of the low-frequency component of the signal A6 outputted from the LPF 6, the spectrum of the signal A2 obtained by adding up these signals with each other is not flat, i.e., an ideal reproduced signal having a compensated low-frequency component cannot be obtained. In general, the gains of high-frequency components of input and output signals in the HPF 1 are equal to each other, while those of low-frequency components of input and output signals in the LPF 6 are also equal to each other. In order to equalize the gain of the high-frequency component of the output signal from the HPF 1 with that of the low-frequency component of the output signal from the LPF 6, therefore, the amplitude of the input signal A0 of the HPF 1 may be rendered to match with half that of the input signal A5 of the LPF 6. When the amplitude of the binarized signal A3 outputted from the comparator 3 cannot be arbitrarily changed, the gains may be adjusted by amplifying or attenuating the output signal A5 of the pulse compensation circuit 5 or the output signal A6 of the LPF 6 by an amplifier, an attenuator or a voltage divider.

According to this embodiment, as hereinabove described, the pulse signal A5 having a duty ratio of about 50% is inputted in the LPF 6 from the pulse compensation circuit 5 in reproduction of the VFO part 31, whereby the signal of the VFO part 31 can be reproduced into the stable binarized signal A3 even if the HPF 1 has a high cut-off frequency to cause a severe transient response in the reproduced signal. Therefore, it is possible to set the cut-off frequency of the HPF 1 at a high level thereby more effectively removing an influence by AC coupling (not shown) for removing the DC component which is superposed on the reproduced signal, i.e., a low-frequency noise caused in the reproduced signal by a remaining part of the DC component or reflectance fluctuation as compared with the prior art. Further, an accurate digital signal can be obtained also in the case of reproducing information by PRML utilizing the output of the adder 2.

Figure 4:
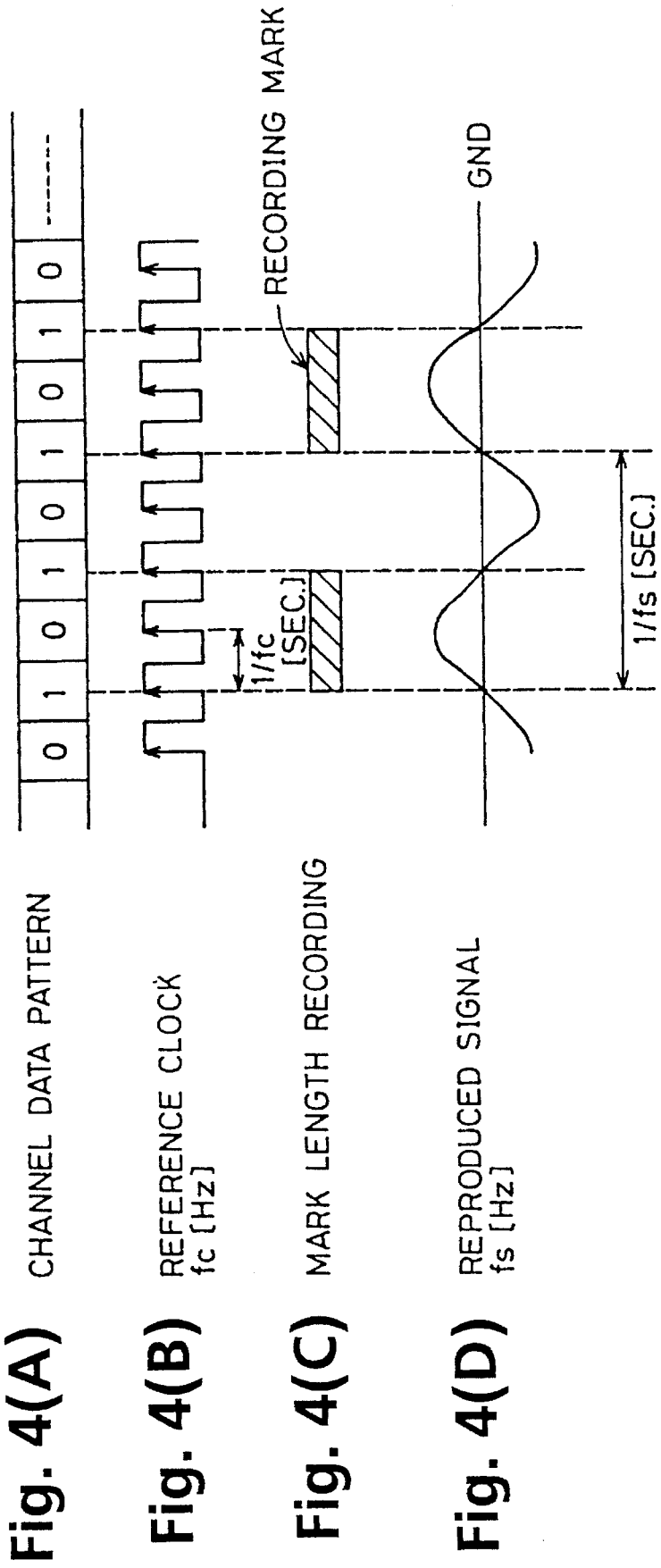
FIG. 4 is a diagram for illustrating the operation of a frequency divider shown in FIG. 3.

FIG. 4 is adapted to illustrate the operation of the frequency divider 13 shown in FIG. 3. The frequency of the pulse signal A13 which is obtained by frequency division in the frequency divider 13 is preferably decided to match with that of the reproduced signal. This is now described with reference to FIG. 4. When modulation is made by a (1, 7) modulation system and the VFO part 31 has a channel data pattern of ". . . 010101010 . . . " shown at (a) in FIG. 4, for example, a frequency fs of a reproduced signal shown at (d) obtained by making mark length recording of the channel data pattern as shown at (c) is expressed, with respect to a frequency fc of the reference clock oscillator 12 shown at (b) in FIG. 4, as follows:

$$fs=fc/4$$

In this case, therefore, the reference clock signal A12 outputted from the reference clock oscillator 12 is preferably frequency-divided to ¼ by the frequency divider 13.

While the low-frequency component of the reproduced signal is compensated through the compensation signal (the pulse signal A13 outputted from the frequency divider 13) from the pulse compensation circuit 5 only in signal reproduction of the VFO part 31 which is arranged at the head of the data part in this embodiment, the low-frequency component of the reproduced signal can be similarly compensated through the compensation signal (the pulse signal A13) also in signal reproduction of a VFO part 31 in relation to an AM 32 and an ID 33 in the header part, as a matter of course.

Other exemplary structures of the pulse compensation circuit 5 are now described with reference to FIGS. 5 and 6.

Figure 5:
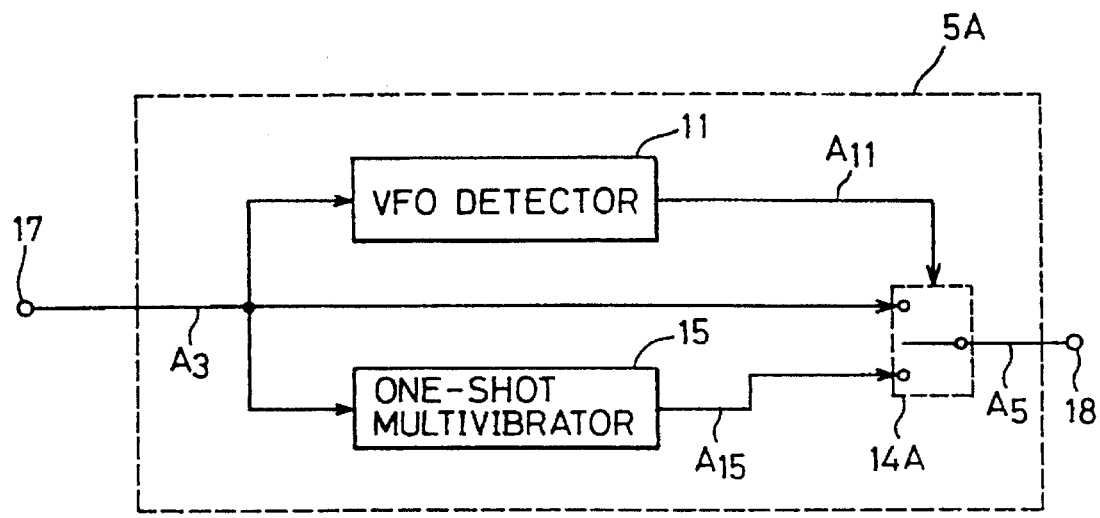
FIG. 5 is a block diagram showing another exemplary pulse compensation circuit according to the first embodiment of the present invention.

FIG. 5 is a block diagram showing another example of the pulse compensation circuit according to the first embodiment of the present invention.

An information reproducing circuit which is formed by replacing the pulse compensation circuit 5 shown in FIG. 1 by a pulse compensation circuit 5A shown in FIG. 5 is now described with reference to FIGS. 1, 3 and 5. Portions of the information reproducing circuit employing the pulse compensation circuit 5A shown in FIG. 5 which are identical to those shown in FIG. 1 are denoted by the same reference numerals, to omit redundant description.

Input and output sides of the pulse compensation circuit 5A shown in FIG. 5 are connected to the terminals 17 and 18 of the information reproducing circuit shown in FIG. 1 respectively. The pulse compensation circuit 5A includes a VFO detector 11, an analog switch 14A and a one-shot multivibrator 15.

Referring to FIG. 5, the one-shot multivibrator 15 is adjusted to output a pulse train which maintains a high level for a time equal to the shortest mark length, i.e., a pulse train having a duty ratio of about 50%, on the basis of a pulse train of a binarized signal A3 outputted from a comparator 3. A pulse signal A15 outputted from the one-shot multivibrator 15 is supplied to one input side of the analog switch 14A. The analog switch 14A, receiving the binarized signal A3 in another input side thereof, is controlled by a VFO part detection signal A11 outputted from the VFO detector 11, to input the pulse signal (the pulse signal having a duty ratio of about 50 %) A15 outputted from the one-shot multivibrator 15 to an LPF 6 as an output signal A5 in reproduction of the VFO part 31, while outputting the binarized signal A3 outputted from the comparator 3 as the output signal A5 in other case. The frequency of the pulse signal A15 outputted from the one-shot multivibrator 15 is preferably set to match with that of the reproduced signal, similarly to the aforementioned signal A13. Further, it is necessary to set the output level of the one-shot multivibrator 15 substantially at the same level as that of the comparator 3.

The aforementioned operation is described with reference to the waveform diagram shown in FIG. 3. FIG. 3 shows the output signal A1 of the HPF 1 at (a), the output signal of the reference clock oscillator of the optical disk unit, i.e., the output signal A12 of the reference clock oscillator 12 at (b), and the binarized signal A3 outputted from the comparator 3 at (c) respectively. FIG. 3 also shows the result of detection of the SM 30 with respect to these signals by various techniques which have been proposed in general at (d). FIG. 3 further shows the result of detection of the header part on the basis of the result of detection of the SM 30 at (e). This can be obtained by counting the clock number of the reference clock signal A12 in a period up to a time immediately ahead of starting of the gap between the header part and the data part from the SM 30. FIG. 3 further shows the VFO part detection signal A11 at (f). The signal A11 is started from the time when the binarized signal A3 (see (c) in FIG. 3) outputted from the comparator 3 rises at the first of the data part and completed after a lapse of the time corresponding to the length of the VFO part 31. The length of the VFO part 31 is previously decided, and can be measured by counting the clock number of the clock signal A12 outputted from the reference clock oscillator 12. FIG. 3 further shows the waveform of the output signal A5 of the pulse compensation circuit 5A at (g), which is in the waveform of the pulse signal A15 outputted from the one-shot multivibrator 15 in the VFO part 31. The output signal A5 of the pulse compensation circuit 5A is inputted in the LPF 6, to be converted to the signal A6 having the waveform shown at (h) in FIG. 3. The signal A6 is added up with the signal A1 shown at (a) in FIG. 3, to obtain the signal A2 of the waveform shown at (i) in FIG. 3, which in turn is outputted to the comparator 3.

Also according to the pulse compensation circuit 5A, an effect similar to that of the information reproducing circuit shown in FIG. 1 employing the aforementioned pulse compensation circuit 5 can be attained.

Figure 6:
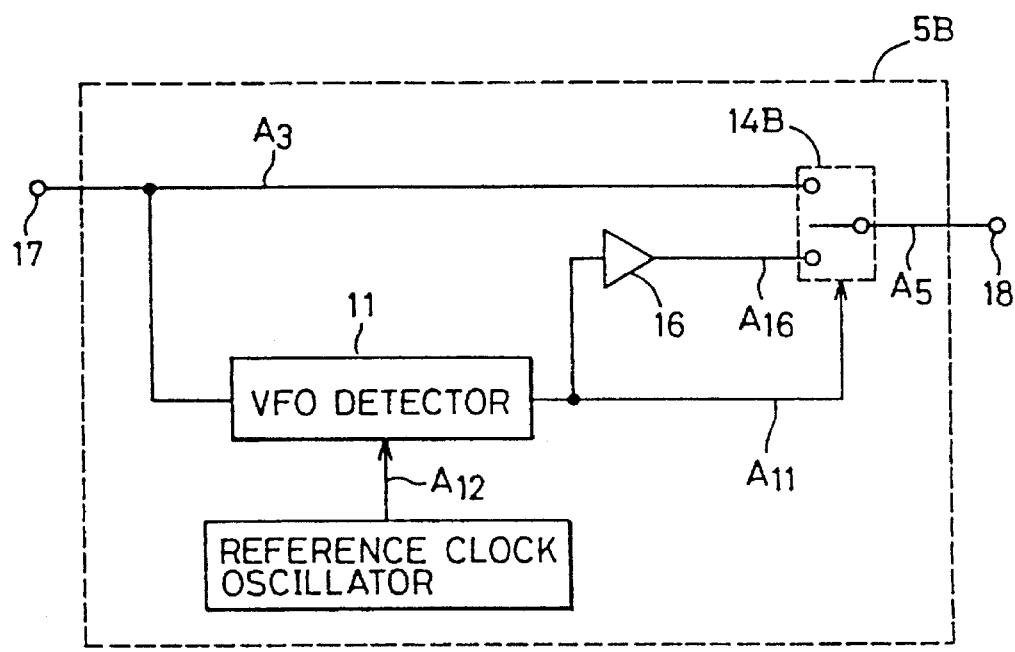
FIG. 6 is a block diagram showing still another exemplary pulse compensation circuit according to the first embodiment of the present invention.
Figure 7:
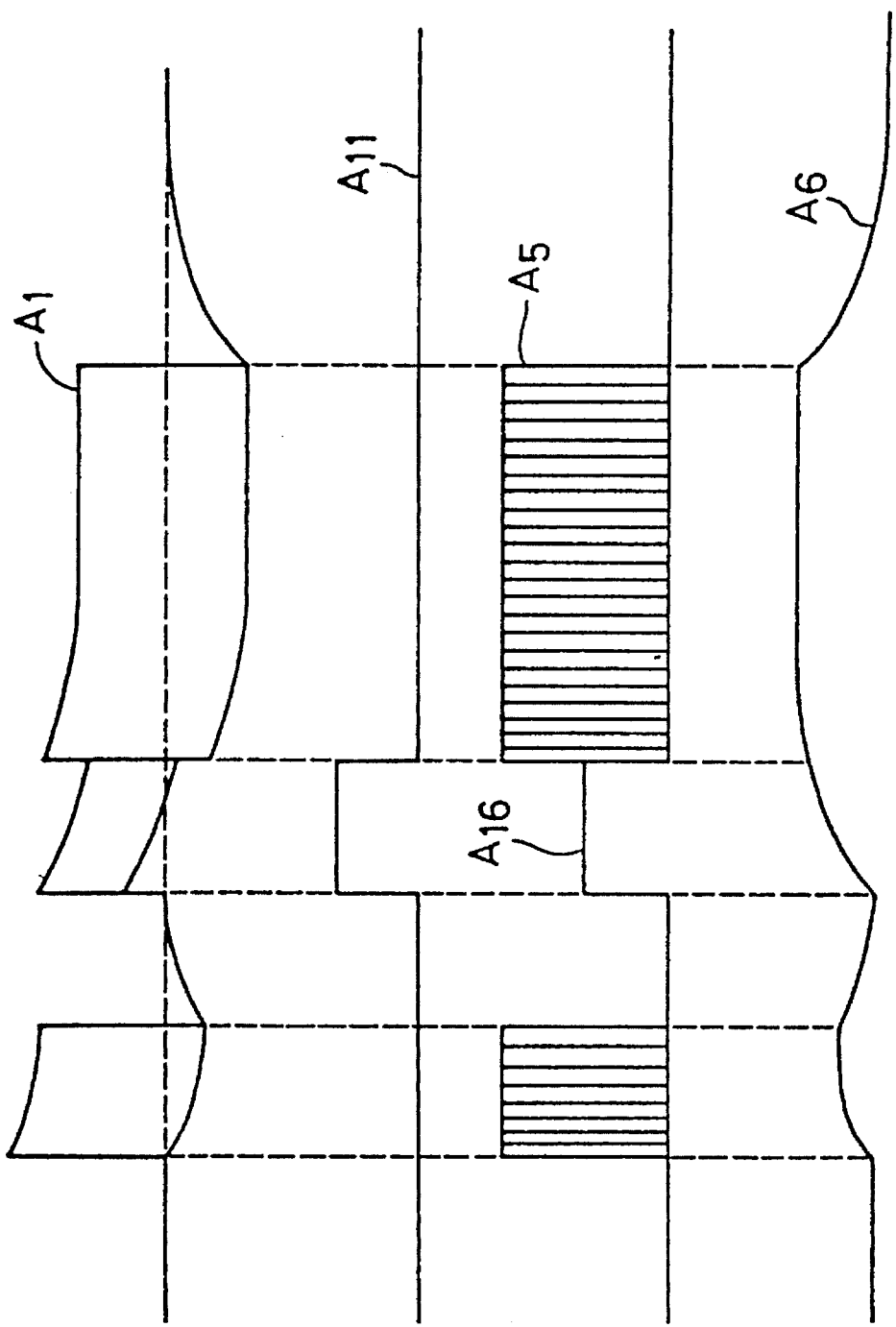
FIG. 7 is a waveform diagram for illustrating the operation of the information reproducing circuit shown in FIG. 1 employing the pulse compensation circuit of FIG. 5.
Figure 10:
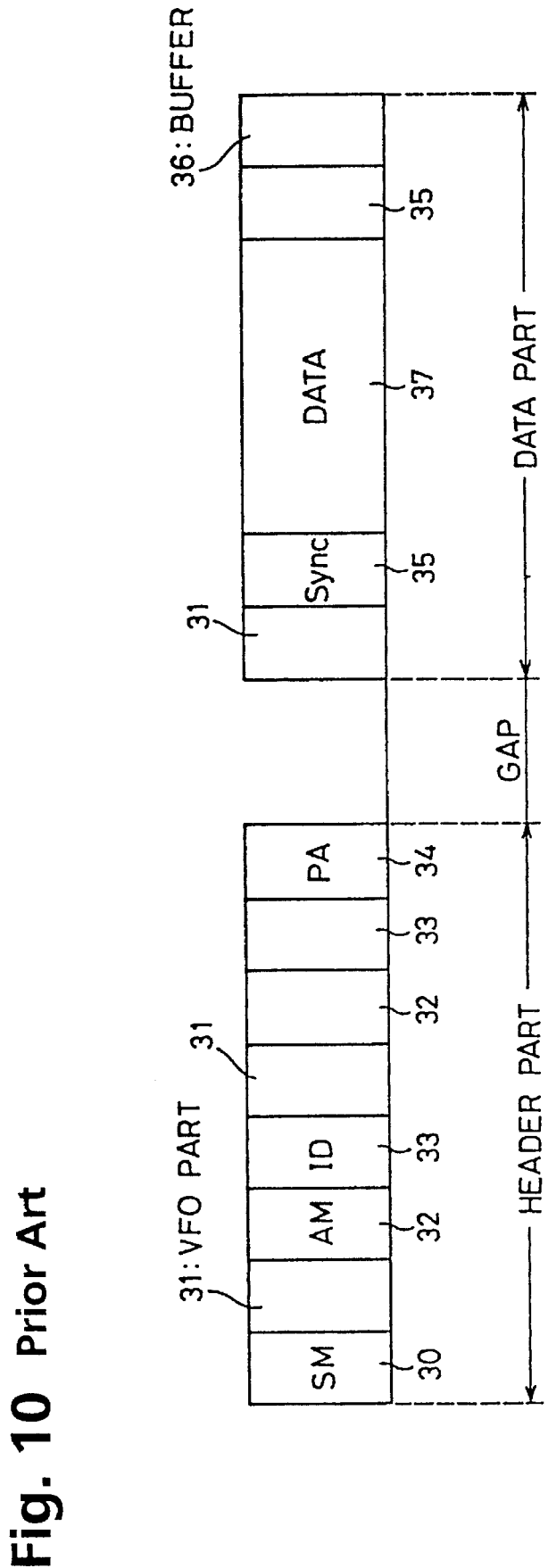
FIG. 10 illustrates an exemplary sector format on a recording medium which is applied to the prior art and the embodiments of the present invention.
Figure 11:
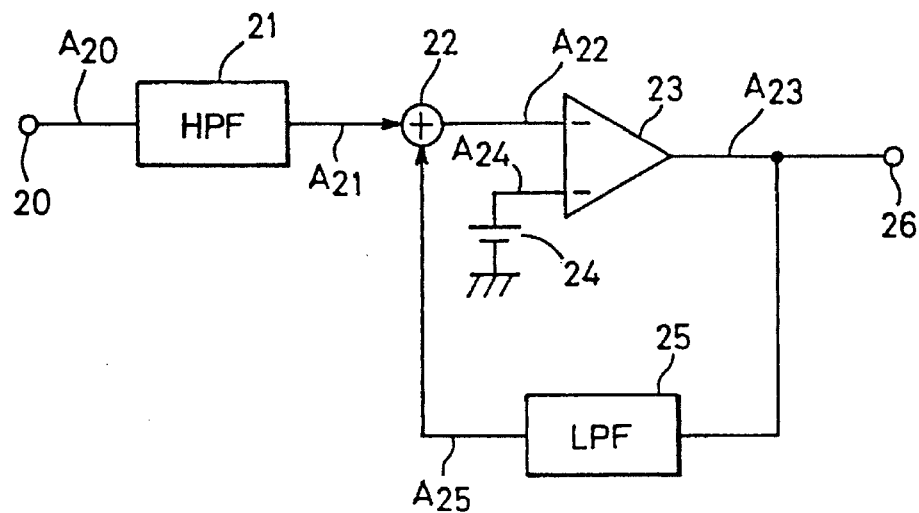
FIG. 11 is a block diagram showing a conventional information reproducing circuit employing decision feedback.
Figure 12A:
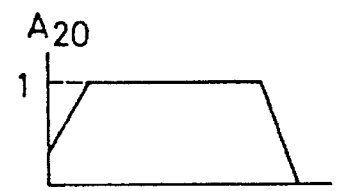
FIG. 12 is a spectral diagram for illustrating the operation of the information reproducing circuit shown in FIG. 11.
Figure 12B:
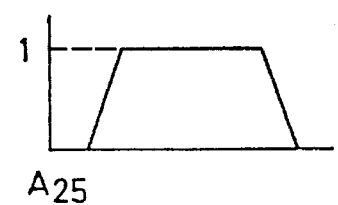
Figure 12C:
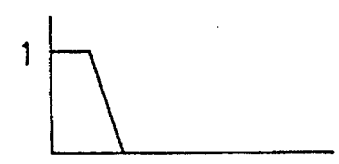
Figure 12D:
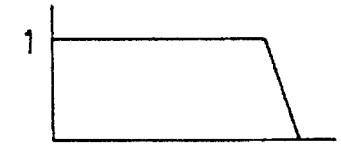
Figures 13A, 13B, 13C:
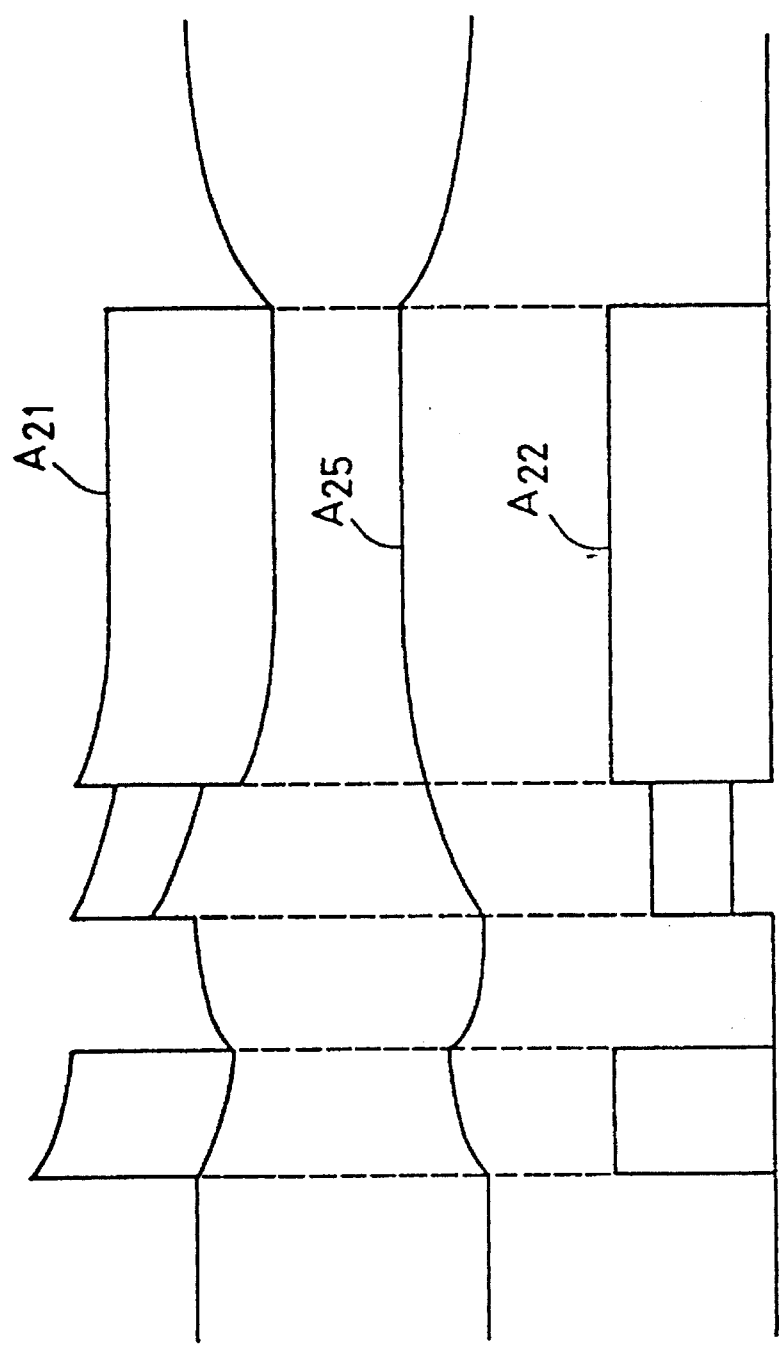
FIG. 13 is a waveform diagram showing the operation of the information reproducing circuit shown in FIG. 11.

FIG. 6 is a block diagram showing still another example of the pulse compensation circuit according to the first embodiment of the present invention. FIG. 7 is a waveform diagram for illustrating the operation of an information reproducing circuit employing the pulse compensation circuit 5B shown in FIG. 6. Portions of the information reproducing circuit employing the pulse compensation circuit 5B shown in FIG. 6 which are identical to those shown in FIG. 1 are denoted by the same reference numerals, to omit redundant description.

Input and output sides of the pulse compensation circuit 5B shown in FIG. 6 are connected to the terminals 17 and 18 of the information reproducing circuit shown in FIG. 1 respectively. The pulse compensation circuit 5B includes a VFO detector 11, a reference clock oscillator 12, an analog switch 14B and an amplifier 16.

The VFO detector 11 inputs a binarized signal A3 outputted from a comparator 3, to carry out an operation which is similar to that described with reference to the first embodiment, on the basis of a reference clock signal A12. Namely, the VFO detector 11 detects a VFO part 31 and outputs a VFO part detection signal A11 to the analog switch 14B. This analog switch 14B inputs the binarized signal A3 outputted from the comparator 3 and an output signal A16 of the amplifier 16, to output the output signal A16 of the amplifier 16 to an LPF 6 as an output signal A5 when the VFO part 31 is reproduced on the basis of the VFO part detection signal A11, while outputting the binarized signal A3 to the LPF 6 as the output signal A5 in other case. FIG. 7 shows the VFO part detection signal A11 at (b). This signal A11 is inputted in the analog switch 14B as the output signal A16 through the amplifier 16. The amplifier 16 amplifies or attenuates the VFO part detection signal A11 which is a step potential signal, to adjust the step potential of the signal A11 to be half the signal amplitude of a data part. Due to this adjustment, the output signal A6 of the LPF 6 converges to a potential which is half the data part signal amplitude also when an HPF 1 has a large cut-off frequency. FIG. 7 shows the waveform of an output signal A5 from the pulse compensation circuit 5B at (c). The output signal A5 shown at (c) in FIG. 7 is the step potential signal A16 having a constant amplitude value in the VFO part 31, while being a pulse signal of the binarized signal A3 outputted from the comparator 3 in parts other than the VFO part 31. This signal A5 is converted to an ideal feedback signal A6 shown at (d) in FIG. 7 in the LPF 6, and outputted to the adder 2. The signal A6 shown at (d) in FIG. 7 is added up with a signal A1 outputted from the HPF 1, which is shown at (a) in FIG. 7, in the adder 2.

Also in the information reproducing circuit employing the pulse compensation circuit 5B, as hereinabove described, the ideal feedback signal A6 can be obtained regardless of fluctuation of a relative slice level with respect to an input signal in the comparator 3 or the level of the signal amplitude, in reproduction of the VFO part 31. Thus, the signal of the VFO part 31 can be reproduced into the stable binarized signal A3 while canceling a transient response by the output of the LPF 6 also when the HPF 1 has a high cut-off frequency to cause a severe transient response. Therefore, it is possible to set the cut-off frequency of the HPF 1 at a high level thereby more effectively removing a low-frequency noise caused by reflectance fluctuation or an influence by AC coupling (not shown) which is arranged in front of decision feedback (a low-frequency component in the reproduced signal unremovable through the AC coupling) as compared with the prior art. Further, an accurate digital signal can be obtained also in the case of reproducing information by PRML utilizing the output of the adder 2.

While the output signal A16 of the amplifier 16 is outputted to the LPF 6 to compensate the low-frequency component only in reproduction of the VFO part 31 at the head of the data part in the information reproducing circuit employing the pulse compensation circuit 5B, the same also applies to reproduction of a VFO part 31 in a header part, as a matter of course.

(Second Embodiment)

FIG. 8 is a block diagram showing an information reproducing circuit employing decision feedback according to a second embodiment of the present invention. In the information reproducing circuit shown in FIG. 8, portions identical to those of the circuit shown in FIG. 1 are denoted by the same reference numerals, to omit redundant description.

The information reproducing circuit shown in FIG. 8 includes an HPF 1, an adder 2, a comparator 3, a constant voltage generator 4, an LPF 6, an equalizer 8, and input and output terminals IT and OT.

Referring to FIG. 8, the equalizer 8, which is adapted to equalize a signal A2 received from the adder 2, is a well-known member having a function of amplifying a high-frequency component of the signal A2. The amplitude of the high-frequency component of the signal A2 which is inputted in the equalizer 8, i.e., the amplitude of a VFO part 31, is amplified by the equalizer 8, so that this signal is outputted to the comparator 3 as an output signal A8. The comparator 3 compares the output signal A8 of the equalizer 8 with a slice level signal A4 from the constant voltage generator 4, and outputs a binarized signal A3. The binarized signal A3 is inputted in the LPF 6, and added up with an input signal A2 as a feedback signal A6 having half amplitude of signal A3 in the adder 2. The signal A8 which is obtained by amplification in the equalizer 8 may have such an amplitude that the pulse duration of the binarized signal A3 is not much changed even if relative slice level fluctuation is caused in the comparator 3.

Concrete characteristics of the equalizer 8 are described with reference to waveforms shown in FIG. 9. FIG. 9 shows the waveforms of the input signal A2 and the output signal A8 of the equalizer 8 at (a) and (b) respectively. As shown in FIG. 9, the signal amplitude of the VFO part 31 which is the high-frequency component of the input signal A2 of the equalizer 8 is amplified and converted to a binarized signal A3 in the comparator 3. Since the signal amplitude of the VFO part 31 is amplified, the binarized signal A3 outputted from the comparator 3 becomes a pulse train having a duty ratio of about 50% even if the slice level is relatively displaced due to fluctuation of light reflectance of an optical disk or the like, whereby excellent decision feedback can be carried out.

In the information reproducing circuit shown in FIG. 8, as hereinabove described, the signal amplitude of the VFO part 31 is amplified so that an influence by relative fluctuation of the slice level can be suppressed, thereby carrying out stable decision feedback. Further, no analog switch (14, 14A or 14B) is employed dissimilarly to the first embodiment, whereby high signal quality can be maintained with no influence exerted by a noise component which is specific to the analog switch.

The information reproducing circuit according to the first or second embodiment of the present invention can carry out stable decision feedback as hereinabove described, whereby a digital signal can be reproduced from a signal which is read from a recording medium in high accuracy. Further, the cut-off frequency of the HPF 1 can be set at a high level, whereby a low-frequency noise which is caused by fluctuation in light reflectance of the recording medium or an influence of the AC coupling arranged in front of the information reproducing circuit is so effectively removed that the detection margin for the reproduced signal can be increased. Also in the case of reproducing information by PRML through the output of the adder 2, a highly accurate digital signal can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information reproducing circuit for reproducing digital information from a signal being read by scanning a medium previously recording said digital information, said information reproducing circuit comprising:

a high-pass filter receiving said read signal and removing a low-frequency component from the received read signal for outputting the same;

an adder receiving said signal being outputted from said high-pass filter, adding a feedback signal having an amplitude matching with half that of the received read signal for and outputting the same;

a comparator receiving said output signal from said adder, binarizing the received input signal with a threshold value signal, and outputting a binarized signal;

a compensation circuit receiving said binarized signal being outputted from said comparator and outputting the received binarized signal while compensating the same with a compensation signal for compensating a low-frequency component of said read signal; and a low-pass filter receiving said signal being outputted from said compensation circuit, removing a high-frequency component from the receiving signal, and supplying the receiving signal to said adder as said feedback signal, said compensation circuit comprising:

signal generation means for generating and outputting said compensation signal, and control means receiving said binarized signal being outputted from said comparator and said compensation signal being outputted from said signal generation means and outputting said binarized signal to said low-pass filter in an ordinary period while outputting said compensation signal to said low-pass filter in a compensation period.

2. The information reproducing circuit in accordance with claim 1, wherein said control means includes:

detection means for detecting and outputting said compensation period through said binarized signal being outputted from said comparator, and switching means receiving said binarized signal being outputted from said comparator and outputting the same to said low-pas filter in said ordinary period while receiving said compensation signal being outputted from said signal generation means and outputting the same to said low-pass filter in said compensation period in response to said detection output of said detection means.

3. The information reproducing circuit in accordance with claim 1, wherein said read signal includes a signal of said digital information to be reproduced and a synchronous clock creation signal for creating a synchronous clock being positioned immediately ahead of said signal of said digital information and employed for reproducing said signal of said digital information, said compensation signal being a signal for creating a low-frequency component of ideal said synchronous clock creation signal.

4. The information reproducing circuit in accordance with claim 3, wherein said compensation signal is a pulse signal having a duty ratio of about 50% and a prescribed frequency matching with the frequency of said synchronous clock creation signal, said signal generation means including:
pulse signal generation means generating said pulse signal and outputting the same to said control means.

5. The information reproducing circuit in accordance with claim 4, wherein said compensation period is a period when said synchronous clock creation signal is read from said medium.

6. The information reproducing circuit in accordance with claim 4, wherein said pulse signal generation means includes:

clock oscillation means oscillating a reference clock, and frequency dividing means frequency-dividing said reference clock being oscillated by said clock oscillation means to have a duty ratio of about 50% and said prescribed frequency and outputting the same to said control means.

7. The information reproducing circuit in accordance with claim 6, wherein said compensation period is a period when said synchronous clock creation signal is read from said medium.

8. The information reproducing circuit in accordance with claim 4, wherein said pulse signal generation means includes:

multivibrator means receiving said binarized signal being outputted from said comparator and converting the received binarized signal into a signal having a duty ratio of about 50% and said prescribed frequency for outputting the same to said control means.

9. The information reproducing circuit in accordance with claim 8, wherein said compensation period is a period when said synchronous clock creation signal is read from said medium.

10. The information reproducing circuit in accordance with claim 3, wherein said control means includes:

detection means for detecting and outputting said compensation period through said binarized signal being outputted from said comparator, and switching means receiving said binarized signal being outputted from said comparator and outputting the same to said low-pass filter in said ordinary period while receiving said compensation signal being outputted from said signal generation means and outputting the same to said low-pass filter in said compensation period in response to said detection output of said detection means.

11. The information reproducing circuit in accordance with claim 10, wherein said compensation signal is a pulse signal having a duty ratio of about 50% and a prescribed frequency matching with the frequency of said synchronous clock creation signal, said signal generation means including:
pulse signal generation means generating said pulse signal and outputting the same to said control means.

12. The information reproducing circuit in accordance with claim 11, wherein said compensation period is a period when said synchronous clock creation signal is read from said medium.

13. The information reproducing circuit in accordance with claim 11, wherein said pulse signal generation means includes:

clock oscillation means oscillating a reference clock, and frequency dividing means frequency-dividing said reference clock being oscillated by said clock oscillation means to have a duty ratio of about 50% and said prescribed frequency and outputting the same to said control means.

14. The information reproducing circuit in accordance with claim 13, wherein said compensation period is a period when said synchronous clock creation signal is read from said medium.

15. The information reproducing circuit in accordance with claim 11, wherein said pulse signal generation means includes:

multivibrator means receiving said binarized signal being outputted from said comparator and converting said received binarized signal to a signal having a duty ratio of about 50% and said prescribed frequency for outputting the same to said control means.

16. The information reproducing circuit in accordance with claim 15, wherein said compensation period is a period when said synchronous clock creation signal is read from said medium.

17. The information reproducing circuit in accordance with claim 10, wherein said signal of said digital information has said digital information to be reproduced at the center of its amplitude, and said compensation signal is a potential signal having a potential level being about half said amplitude of said signal of said digital information, said signal generation means including:
    potential signal generation means generating said potential signal and outputting the same to said control means.

18. The information reproducing circuit in accordance with claim 17, wherein said compensation period is a period when said synchronous clock creation signal is read from said medium.

19. The information reproducing circuit in accordance with claim 17, wherein said detection output of said detection means is a step signal being at a high level only in said compensation period, said potential signal generation means including:
    means receiving said step signal and adjusting the gain of the received step signal to about half said amplitude of said signal of said digital information for outputting the same to said control means.

20. The information reproducing circuit in accordance with claim 19, wherein said compensation period is a period when said synchronous clock creation signal is read from said medium.

21. The information reproducing circuit in accordance with claim 10, wherein said compensation period is a period when said synchronous clock creation signal is read from said medium.

22. The information reproducing circuit in accordance with claim 3, wherein said signal of said digital information has said digital information to be reproduced at the center of its amplitude, and said compensation signal is a potential signal having a potential level being substantially half said amplitude of said signal of said digital information, said signal generation means including:
    potential signal generation means generating said potential signal and outputting the same to said control means.

23. The information reproducing circuit in accordance with claim 22, wherein said compensation period is a period when said synchronous clock creation signal is read from said medium.

24. The information reproducing circuit in accordance with claim 3, wherein said compensation period is a period when said synchronous clock creation signal is read from said medium.

25. An information reproducing circuit for reproducing digital information from a signal being read by scanning a medium previously recording said digital information, said information reproducing circuit comprising:

a high-pass filter receiving said read signal and removing a low-frequency component from the received read signal for outputting the same;

an adder receiving said signal being outputted from said high-pass filter, adding a feedback signal having an amplitude matching with half that of the received read signal for and outputting the same;

a compensation circuit receiving said output signal of said adder and outputting the received read signal while compensating the same;

a comparator receiving said signal being outputted from compensation circuit, binarizing the received read signal on the basis of a relative slice level being decided by a threshold value signal and outputting a binarized signal; and a low-pass filter receiving said binarized signal being outputted from said comparator, removing a high-frequency component from the received binarized signal, and supplying the binarized signal without removed the high-frequency component to said adder as said feedback signal, said read signal further including:
    a signal of said digital information to be reproduced and a synchronous clock creation signal for creating a synchronous clock being positioned immediately ahead of said signal of said digital information employed for reproducing said signal of said digital information, said compensation circuit further including:
    adjusting means receiving said signal being outputted from said adder and outputting the received input signal while adjusting the amplitude of said synchronous clock creation signal being included in the received read signal to a level maintaining the duty ratio of corresponding said binarized signal even upon fluctuation of said relative slice level.

26. The information reproducing circuit in accordance with claim 25, wherein said adjusting means includes an equalizer.

* * * * *